United States Patent [19]
Yoon

[11] Patent Number: 5,818,562
[45] Date of Patent: Oct. 6, 1998

[54] LIQUID CRYSTAL DISPLAY DEVICE

[75] Inventor: Jeong Hwan Yoon, Kyungki-do, Rep. of Korea

[73] Assignee: Goldstar Co., Ltd., Seoul, Rep. of Korea

[21] Appl. No.: 791,333

[22] Filed: Jan. 31, 1997

Related U.S. Application Data

[63] Continuation of Ser. No. 372,171, Jan. 12, 1995, abandoned.

[51] Int. Cl.$^6$ .................................................. G02F 1/1345
[52] U.S. Cl. ............................................................ 349/149
[58] Field of Search ................................ 359/88, 59, 54, 359/78, 79, 74; 349/149, 150, 151, 152

[56] References Cited

U.S. PATENT DOCUMENTS

| | | | |
|---|---|---|---|
| 4,483,591 | 11/1984 | Baeger ...................................... | 349/152 |
| 4,655,551 | 4/1987 | Wachizuka et al. ....................... | 349/150 |
| 4,697,885 | 10/1987 | Minowa et al. ........................... | 349/149 |
| 4,767,189 | 8/1988 | Hayashi et al. ........................... | 349/149 |
| 4,813,768 | 3/1989 | Hamiguchi et al. ....................... | 359/74 |
| 5,089,750 | 2/1992 | Hatada et al. ............................. | 349/152 |
| 5,187,604 | 2/1993 | Taniguchi et al. ......................... | 359/88 |
| 5,367,393 | 11/1994 | Ohara et al. ............................... | 359/74 |
| 5,420,708 | 5/1995 | Yokoyama et al. ........................ | 359/88 |
| 5,500,787 | 3/1996 | Yoshida ..................................... | 359/59 |
| 5,510,918 | 4/1996 | Matsunaga et al. ....................... | 359/88 |
| 5,541,748 | 7/1996 | Ono et al. .................................. | 359/59 |
| 5,581,382 | 12/1996 | Kim ........................................... | 349/149 |

FOREIGN PATENT DOCUMENTS

| | | | |
|---|---|---|---|
| 60-238817 | 11/1985 | Japan ...................................... | 349/149 |
| 4-153623 | 5/1992 | Japan ...................................... | 349/152 |
| 6-235928 | 8/1994 | Japan ...................................... | 349/149 |

*Primary Examiner*—William L. Sikes
*Assistant Examiner*—James A. Dudek
*Attorney, Agent, or Firm*—John P. White; Cooper & Dunham LLP

[57] ABSTRACT

A liquid crystal display panel provided with a protection film at the edge of each pad part for preventing cause of short circuits between pads and oblique leads of the TCP at bonding the inner leads of the TCP and the pads, including a upper and a lower substrates, a display part divided into a TFT array part formed on the lower substrate having a plurality of gate bus lines and a plurality of source bus lines, and a pixel part formed on the upper substrate and having liquid crystal injected between the upper and the lower substrates, gate pad parts positioned on the lower substrate at one side of the display part each having a plurality of pads each connected to one of the gate bus lines of the TFT array of the display part for supplying driving voltage to the gate bus lines of the TFT array successively through each pad, source pad parts positioned on the lower substrate at the upper and the lower sides of the display part each having a plurality of pads each connected to one of the source bus lines of the TFT array of the display part for supplying signal voltage to the source bus lines of the TFT array through respective pads, and a protection film formed at the display part and at the edges of the gate pad parts and the source parts.

3 Claims, 6 Drawing Sheets

LIQUID CRYSTAL DISPLAY DEVICE

This application is a continuation of U.S. Ser. No. 08/372,171, filed Jan. 12, 1995, now abandoned.

FIELD OF THE INVENTION

This invention relates to a liquid crystal display devices, more particularly to a pad structure of the liquid crystal display panel, which can prevent oblique leads of a tape carrier package from overlapped and short circuited with pads at the time of bonding the pads with the tape carrier package by means of a protection film of predetermined thickness provided at each end of the pads.

DESCRIPTION OF THE PRIOR ART

FIG. 1 is a schematic illustration of a section of a conventional liquid crystal display device.

As shown in FIGS. 1a–1c, the TFT-LCD panel 100 includes a display part and pad parts at large, wherein the display part 110 has a TFT-array part formed on a lower substrate 120 and a pixel part formed on a upper substrate 130, the pad parts 140 include a gate pad part 142 positioned on the lower substrate 120 at the left side of the display part 110 for supplying driving voltage to gate bus lines of the TFT array of the display part 110 successively and a source pad parts 141 positioned on the lower substrate 120 at upper and lower sides of the display part 110 for actually transmitting data voltage to liquid crystal cells through TFTs turned on at applying signal voltage to source bus lines of the TFTs of the display part 110. Herein, reference number 170 is a passivation layer for covering the LCD panel excluding pad parts, i.e., only the display part 110 of the LCD panel.

Referring to FIGS. 1a–1c, liquid crystal 150 has been injected into a sealed space between the upper and lower substrates 120 and 130 of the LCD panel 100. Polarizing plates 161 and 162 are bonded on the outer surfaces of the upper and lower substrates 120 and 130. Herein, though the gate pad part 142 of the pad parts 140 is positioned at the left side of the display part 110 in FIGS. 1a–1c, different from the above, it may be positioned at the left and right sides of the display part 110.

Processes for fabricating the conventional LCD module is to be explained hereinafter.

The processes includes a first step for forming the TFT array and the pad parts 140 on the lower substrate 120 with conventional processes, a color filter forming the pixel part on the upper substrate 130, and fabricating an LCD panel 100 through sealing the already provided upper and lower substrates 120 and 130 and injecting the liquid crystal 150 between the substrates 120 and 130, a second step for attaching polarizing plates 161 and 162 on the outer surfaces of the upper and lower substrates 120 and 130, a third step for bonding inner leads of the TCP a bare chip 310 of a driving IC for driving the LCD panel 100 is to be mounted thereon to the pad parts 140 of the LCD panel, and a fourth step for assembling the LCD panel 100 and the TCP on the PCB substrate.

FIGS. 4a and 4b show enlarged plan views of a part(P part) for the respective pad parts for the conventional LCD panel 100 shown in FIGS. 1a–1c, wherein FIG. 4a is a plan before the inner leads of the TCP have been attached on the pads, and FIG. 4b is a plan after the inner leads of the TCP have been attached on the pads, respectively.

Referring to FIG. 4a and 4b, the gate pad part 142 of the pad parts 140 is positioned at the left side of the display part 110 of the LCD panel 100 and includes many pads 20a. The source pad parts 141 of the pad parts 140 are positioned at the upper and lower sides of the display part 110 of the LCD panel 100 and includes many pads 20a. Herein, numbers of pads for the gate pad part 142 and the source pad parts 141 are in agreement with the numbers of gate bus lines and source bus lines, respectively.

FIG. 3 is a plan view of a structure of the TCP 300 connected to the pad part in the liquid crystal display module.

Referring to FIG. 3, the TCP 300 includes a part 320 for mounting a bare chip 310 of a driving IC, inner leads 330 each for connecting each of the pads of the pad parts 140 of the liquid crystal display panel 100, oblique leads 340 each for connecting each of the inner leads to the mounted bare chip 310, and outer leads 350 for connecting to the PCB substrate. Herein, number of the inner leads 330 corresponds to the number of pads of each of the pad parts, and though the leads are shown in lines on the drawing, they have a certain width to help bonding with each of the pads.

FIG. 2 shows a section of one TFT of an array of the TFTs in a display part of the liquid crystal display panel of FIG. 1.

Referring to FIG. 2, the TFT includes a gate 121 formed on a predetermined part on a transparent lower substrate 120, a gate insulation film 122 formed on the substrate including the gate 121, a semiconductor layer 123 formed on a part of the gate insulation film 122 opposite to the gate 121, a pixel electrode 180 formed on a part of the gate insulation film 122 not opposed to the gate 121, a source electrode 125 formed covering one side of the semiconductor layer 123 and the gate insulation film 122, a drain electrode 126 formed covering the other side of the semiconductor layer 123 and the pixel electrode 180, an ohmic layer 124 formed between the semiconductor layer 123 and the source/drain electrodes 125 and 126 for providing low resistance contacts between them, and a protection layer 170 formed on entire substrate.

Processes for fabricating the TFT array having the foregoing structure is to be explained hereinafter.

First, the gate 121 and a gate bus line(not shown) are formed by depositing metal on the transparent lower glass substrate 120 and subjecting the deposited metal to a patterning, and a gate insulation film 122 is formed on all over the substrate 120 including the gate 121 and the gate bus line.

The semiconductor layer 123 and the ohmic layer 124 are formed on the gate insulation film 122 opposite to the gate by depositing an amorphous silicon film and an impurity doped amorphous silicon film on the gate insulation film 122 successively and subjecting them to a patterning. Then, the pixel electrode 124 and the pad 20a are formed on the gate insulation film 123 by depositing a transparent conductive film and subjecting it to a patterning, and the source/drain electrodes 125 and 126, and source bus lines(not shown) are formed by depositing metal on all over the substrate and subjecting it to a patterning.

After forming the source/drain electrodes 125 and 126, and the source bus lines, a part of the semiconductor layer 123 over the gate 123 is exposed by removing the ohmic layer 124 between the source/drain electrodes 125 and 126. By depositing the protection layer 170 on all over the substrate except the pad parts, the conventional array of the TFTs can be obtained, finally.

After the LCD panel 100 fabricating processes, the pads of the pad parts 140 of the LCD panel 100 are made to contact with the inner leads 330 of the TCP 300 at the bonding process of the liquid crystal display module.

Thereafter, at the time of assembling of the liquid crystal display module, the LCD panel is connected with a printed circuit board, forming a TFT-LCD module, and making it possible to display input data by forming an electric field according to the power supplied through each pad.

In this case, at bonding the liquid crystal display panel 100 and the TCP 300 under the processes for fabricating a conventional liquid crystal display module shown in FIG. 1, when the pads 20a of the pad parts 140 of the LCD panel 100 shown in FIG. 4a and the inner leads 330 of the TCP 300 are bonded together using conductive resin balls 191, it would look like as shown in FIG. 4b and the section would look like FIG. 5.

However, there has been a problem of occurrence of short circuits between the oblique leads and the pads 20 at bonding the inner leads 330 and the pads 20a due to the contact caused between them in case the inner lead 330 is attached deviated toward the upper substrate 130, though there will not be any occurrence of such short circuits in case the abutting point T of the inner lead 330 and the oblique lead 340 are matched exactly with the end of the pad 20a.

SUMMARY OF THE INVENTION

The object of this invention is to provide a liquid crystal display device which can prevent development of short circuits between pads and oblique leads of a TCP at bonding the inner leads of the TCP with respective pads of the pad parts by means of a protection film formed at the end of the pad parts.

These and other objects and features of this invention can be achieved by providing a liquid crystal display device including, a upper and a lower substrates, a display part divided into a TFT array part formed on the lower substrate having gate bus lines and source bus lines, and a pixel part formed on the upper substrate and having liquid crystal injected between the upper and the lower substrates, gate pad parts positioned on the lower substrate at the left side of the display part each having a plurality of pads each connected to one of the gate bus lines of the TFT array of the display part for supplying driving voltage to the gate bus lines of the TFT array successively through each pad, source pad parts positioned on the lower substrate at the upper and the lower sides of the display part each having a plurality of pads each connected to one of the source bus lines of the TFT array of the display part for supplying signal voltage to the source bus lines of the TFT array through respective pads, a protection film at the display part and at the ends of each pads.

BRIEF DESCRIPTION OF THE DRAWINGS

FIGS. 1a–1c are structures of the conventional liquid crystal display panel, wherein FIG. 1a is a plan view, FIG. 1b is a side view across line A–A' of FIG. 1a, and FIG. 1c is a side view across line B–B' of FIG. 1a.

FIGS. 4a and 4b are enlarged views for each of the pad parts of the liquid crystal display panel of FIG. 1, wherein FIG. 4a shows the pads before the inner leads of the TCP have been bonded, and FIG. 4b shows the pads after the inner leads of the TCP has been bonded.

FIGS. 6a and 6b are enlarged views for each of the pad parts of the liquid crystal display panel in accordance with the present invention, wherein FIG. 6a shows the pads before the inner leads of the TCP have been bonded, and FIG. 6b shows the pads after the inner leads of the TCP has been bonded.

DETAILED DESCRIPTION OF THE INVENTION

Figure 6A:
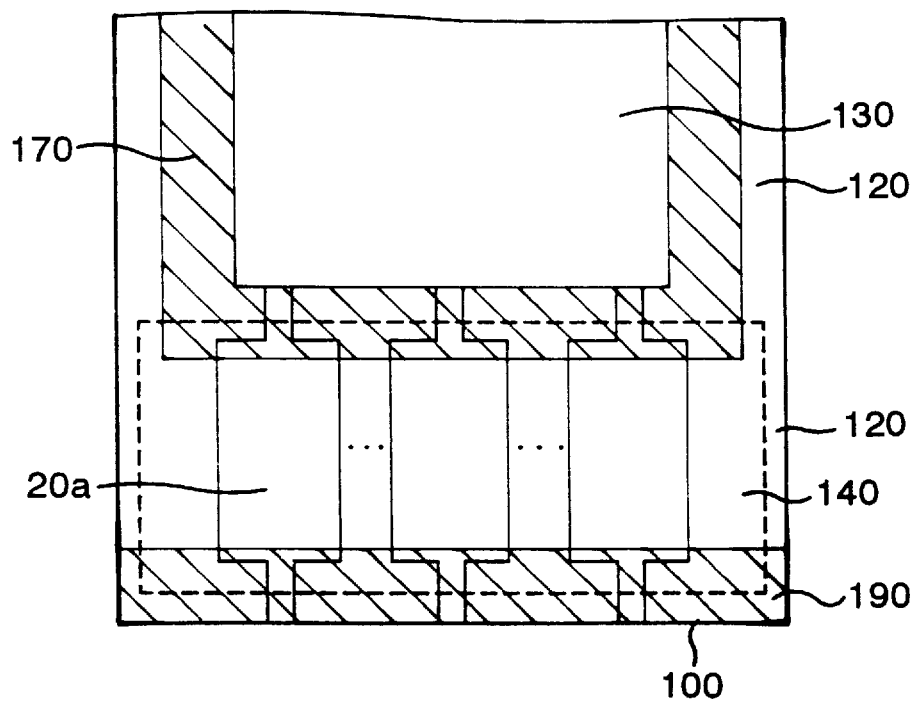
Figure 6B:
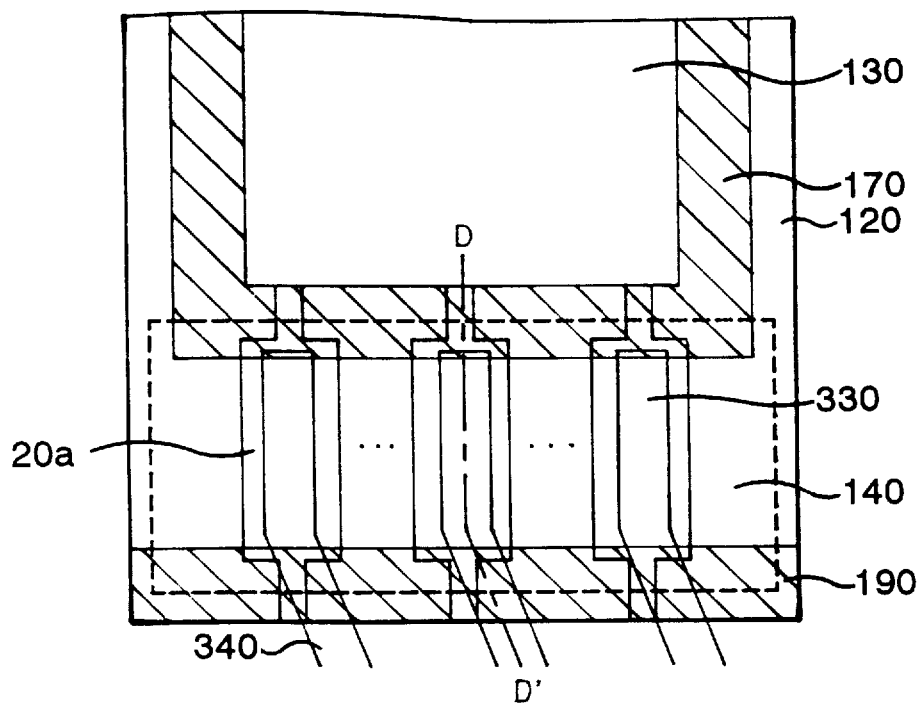
Figure 7:
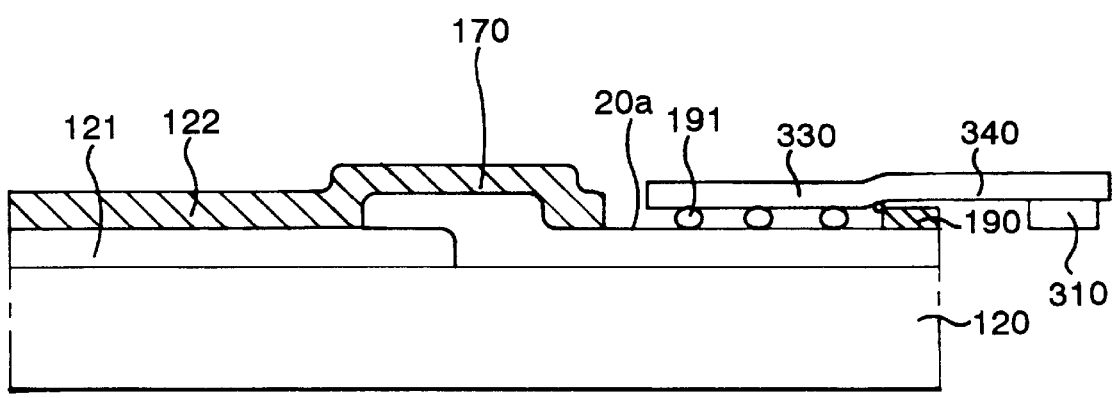
FIG. 7 shows a sectional structure across line D–D' of FIG. 6b.

FIGS. 6a and 6b are enlarged views for each of the pad parts of the liquid crystal display panel in accordance with the present invention, wherein FIG. 6a shows the pads before the inner leads of the TCP have been bonded, and FIG. 6b shows the pads after the inner leads of the TCP have been bonded. FIG. 7 shows a sectional structure across line D–D' of FIG. 6b.

Referring to FIGS. 6a, 6b and 7, a protection film 190 is formed at each end of the source pad part 141 and gate pad part 140 of the liquid crystal display panel 100.

Therefore, since the protection film 190 lies between the oblique leads 340 of the TCP 300 and the pads 20a of the pad parts, even though the oblique leads 340 of the TCP 300 should bonded deviated toward the upper plate, the protection film. 190 can prevent occurrence of short circuits between them.

Figure 1:
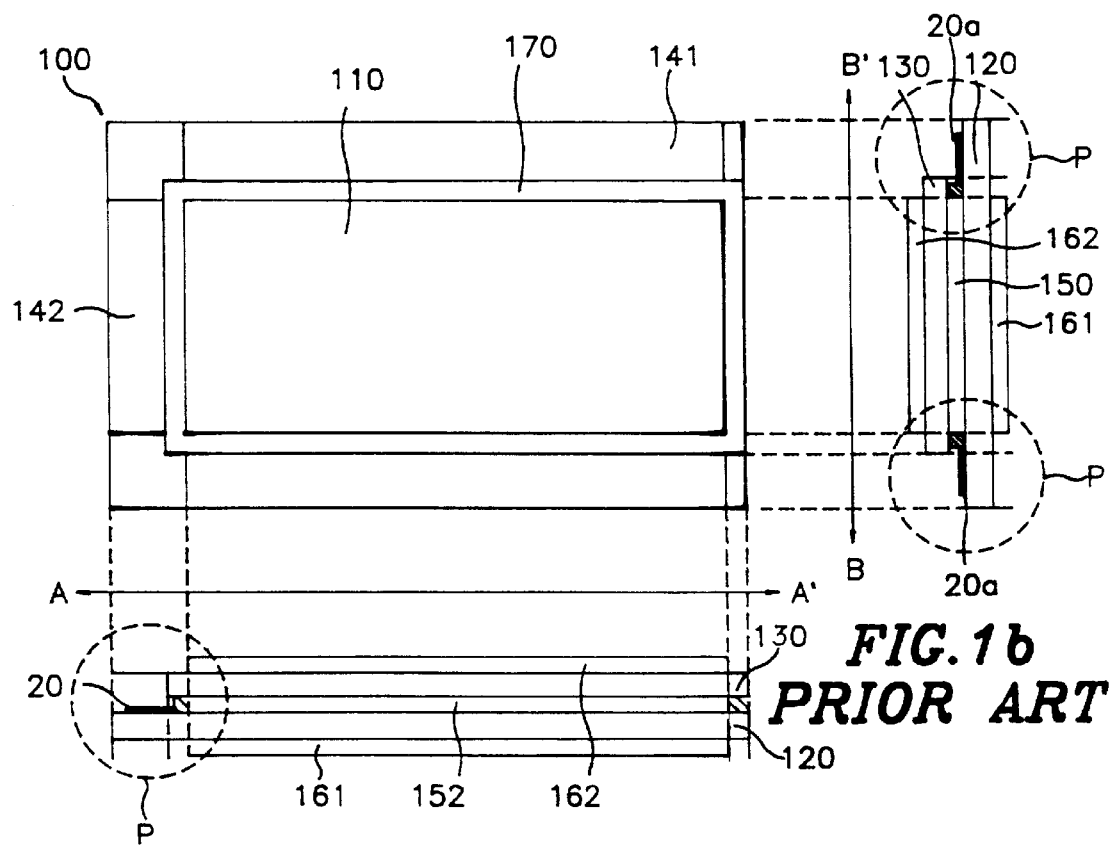
Figure 2:
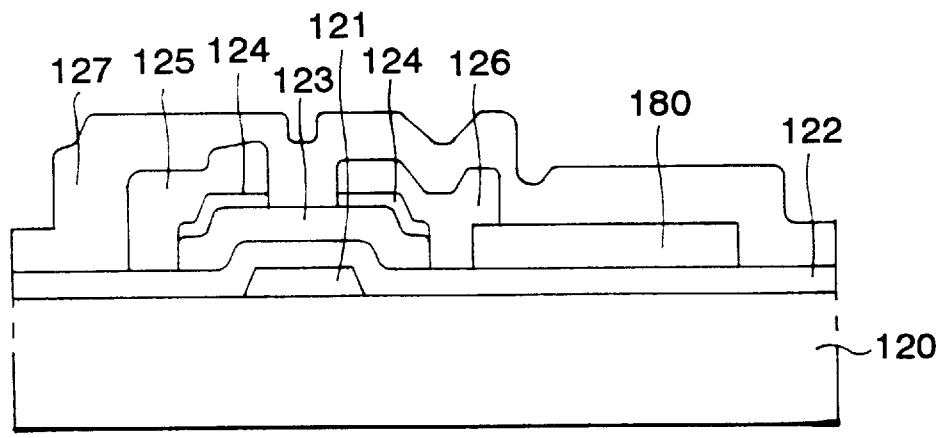
FIG. 2 is a section of one TFT of the array of TFTs of the liquid crystal display panel of FIG. 1.
Figure 3:
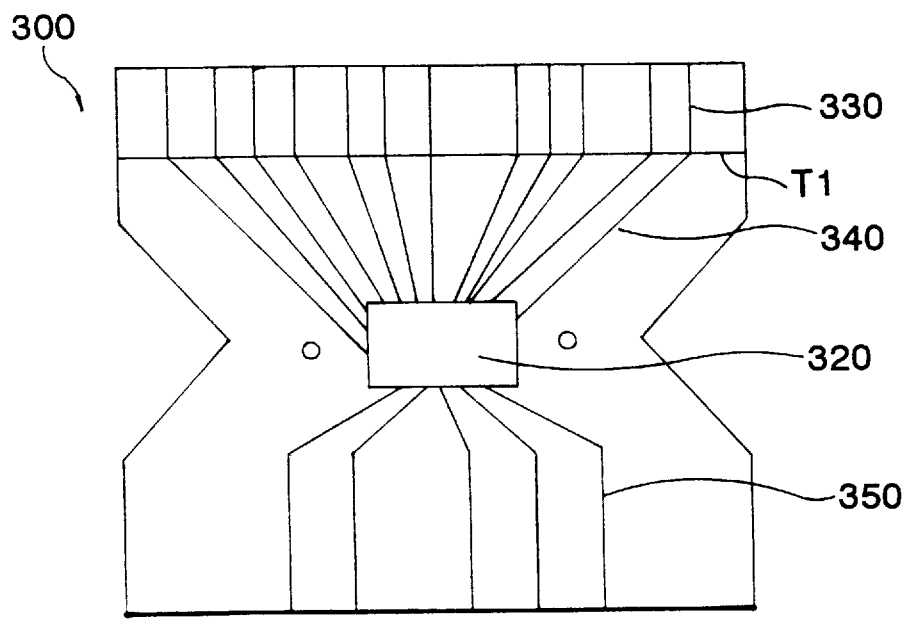
FIG. 3 is a plan view of a conventional TCP structure.
Figure 4A:
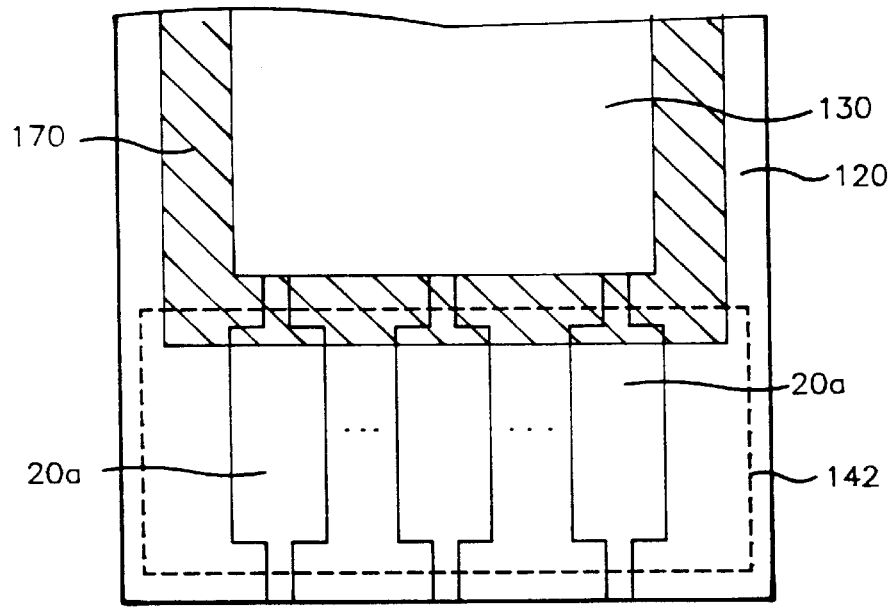
Figure 4B:
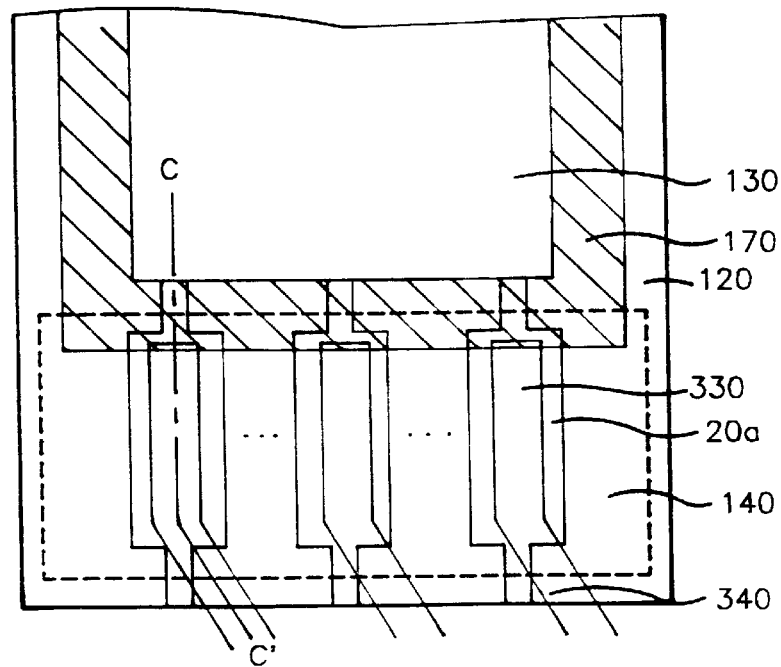
Figure 5:
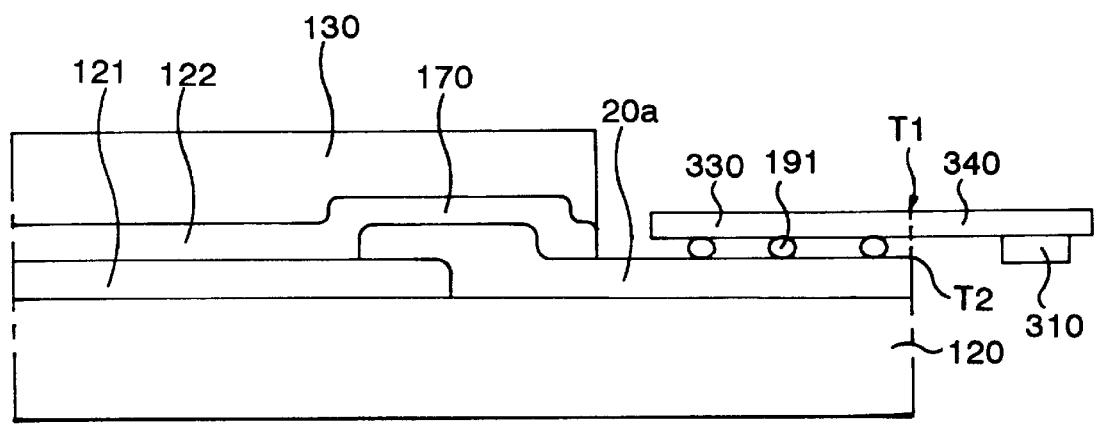
FIG. 5 shows a sectional structure across line C–C' of FIG. 4b.

A method for fabricating the protection film having the foregoing structure is to carry out a patterning of the protection film formed on all over the substrate so that, in this invention, the ends of display part 110 and the pad parts 140 are remained covered though the process for forming the protection film 170 of the conventional method for fabricating the TFT shown in FIG. 2 is to carry out the patterning of the protection film to expose all the pad parts.

The protection films are formed on not only the source pad parts 141 but also the gate pad part 142.

This invention explained above can prevent short circuits between the pads with the inner leads of the TCP, and has an advantage of improving the yield, since such a defects can be prevented by the protection film provided between the pads and the oblique leads of the TCP.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A liquid crystal display panel comprising:

a first substrate and a second substrate;

a TFT array formed on the first substrate, including a plurality of gate lines and a plurality of data lines;

a common electrode on the second substrate;

a liquid crystal disposed between the first substrate and the second substrate;

a plurality of gate pads having a first end connected to each of the gate lines and an opposed second end;

a plurality of data pads having a first end connected to each of the data lines and an opposed second end;

a plurality of inner leads having a plurality of oblique leads, respectively;

said plurality of inner leads connected to said plurality of gate pads and said plurality of data pads;

a first insulating layer formed on a surface of the second end of each of the plurality of gate pads and the plurality of data pads, wherein said surface of the second end of each of the plurality of gate pads and the plurality of data pads is opposite to and facing said plurality of oblique leads; and a second insulating layer formed over the TFT array.

2. A liquid crystal display panel comprising:

a first substrate and a second substrate;

a TFT array including a plurality of gate lines each connected to a first end of a gate pad and a plurality of data lines each connected to a first end of a data pad formed on the first substrate;

a common electrode on the second substrate;

a liquid crystal disposed between the first substrate and the second substrate;

a plurality of inner leads having a plurality of oblique leads, respectively;

said plurality of inner leads connected to said plurality of gate pads and said plurality of data pads;

an insulating layer formed covering a surface of a second end of each of the plurality of gate pads and the plurality of data pads, wherein said surface of the second end of each of the plurality of gate pads and the plurality of data pads is opposite to and facing said plurality of oblique leads.

3. The liquid crystal display panel according to claim 2, wherein the insulating layer on the surface of the second end of the plurality of gate pads and the plurality of data pads is integrated.

* * * * *